May 3, 1932.     E. MAYER     1,856,717

PHOTOGRAPHIC FILM ROLL

Filed May 7, 1930

INVENTOR
Emil Mayer
BY Mock & Blum
ATTORNEYS

Patented May 3, 1932

1,856,717

UNITED STATES PATENT OFFICE

EMIL MAYER, OF VIENNA, AUSTRIA

PHOTOGRAPHIC FILM ROLL

Application filed May 7, 1930, Serial No. 450,458, and in Germany January 20, 1930.

My invention relates to a new and improved photographic film roll.

One of the objects of my invention is to provide a film roll which shall be automatically maintained in tightly-wound condition upon the take-up roller.

Another object of my invention is to provide a film roll in the use of which it shall be unnecessary to paste the end of the paper strip to the body thereof, in order to prevent the film from unrolling upon the take-up roller.

Another object of my invention is to provide a photographic film in roll form, which shall be provided with protective or covering paper of the ordinary kind, and in which the said protective or covering paper shall be combined with means adapted to maintain the film in tightly-wound form upon the take-up roller.

Another object of my invention is to provide a film roll with supplemental means which shall automatically maintain the roll of film in tightly-wound form upon the take-up roller.

Other objects of my invention will be set forth in the following description and drawings, which illustrate preferred embodiments thereof, it being understood that the above general statement of the objects of my invention is intended to generally explain the same and not to limit it in any manner.

It has heretofore been well known to provide a roll of film with a strip of protective paper, so that this protective paper would surround the rolled-up film upon the take-up roller, in order to make it possible to remove the exposed film from the camera. It has heretofore been necessary to provide the end of the strip of protective paper with a tab provided with adhesive, in order to maintain the roll of film in the necessary tightly-wound condition upon the take-up roller.

According to my invention, the strip of protective or covering paper is provided with means which automatically maintain the roll of film in tightly-wound condition upon the take-up roller. For this purpose, the free end of the protective strip is either provided with a strip or body of resilient material which has been bent into predetermined form, or else it is provided with a non-elastic, soft and pliable strip or body of material, having suitable tensile strength. It is desirable to have the inner surface of this strip or body of material (resilient or non-resilient) roughened, and to also have the outer surface of the covering or protective strip also roughened, in order to have suitable friction between the two materials. If an elastic strip or body is utilized, it is shaped into suitable predetermined form, so that the elasticity of the material serves to maintain it in said predetermined form. When the elastic or non-elastic strip is wound in spiral form around the covering or protective strip, the windings of the protective strip are held in suitable tightly-wound condition. If the strip or body before mentioned, is made of elastic material, it acts like a clamp to hold the layers of protective material in position. If the strip or body of material previously mentioned, is made of pliable soft material, it surrounds the rolled-up film so as to maintain it in the desired tightly-wound condition.

One of the main advantages of the invention is that it simplifies the handling of the rolled-up film, as the protective strip is automatically caused to be held in position by the operation of winding-up the film on the take-up roller.

Figure 1:
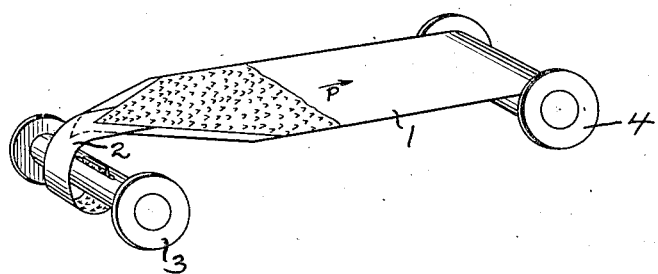
Fig. 1 is a diagrammatic view illustrating the last stage in winding up a roll of film whose film sections have been exposed.
Figure 2:
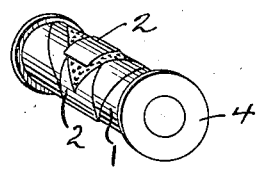
Fig. 2 illustrates the completely rolled-up film, upon the take-up roller.

As shown in Fig. 1, the film whose various film sections have been completely exposed, is provided with a covering strip 1, which is made of paper or of any other suitable material. The end covering or protective strip 1 is provided with an elastic strip 2. The elastic strip 2 can be bent into predetermined form in the process of manufacture, or else this predetermined form can be imparted thereto when it is wound up upon the magazine roller 3. When the film is wound up upon the film or magazine roller 3 in the factory, the end of the elastic closure strip 2 is placed in the slit of the magazine roller 3 so that the closure strip 2 is rolled up upon the roller 3 underneath the paper and the film. In order to utilize the roll of film its free end is placed in the ordinary manner in the slit of the take-up roller 4, and the film is removed from the magazine roller 3 in the direction of the arrow *p*. When the last film section has been exposed, the end protective strip 1 is in the position shown in Fig. 1. Upon further turning the take-up roller 4, the protective strip 1 is wound spirally upon the take-up roller 4, and the closure 2 is similarly wound up upon the exterior of the roll which is located on the take-up roller 4. The shape which has been previously imparted to the closure 2 causes it to snugly fit upon, and to clamp the exterior of the roll located upon the take-up roller 4, as clearly illustrated in Fig. 2. Hence, after the film has been rolled up upon the take-up roller 4, the roller 4 can be immediately removed from the camera.

In order to secure sufficient frictional hold between the closure strip 2 and the covering strip 1, the inner surface of the elastic closure strip 2, and the outer surface of the covering strip 1, can be roughened, or one of these surfaces may be roughened. The roughening of the before mentioned surfaces is indicated by the dotted portions shown in Figs. 1 and 2. This prevents any shifting of the closure strip upon the protective strip, or any unwinding of the roll of film. The elastic closure strip 2 can be connected to the paper covering strip 1 in any suitable manner. It would not be departing from the invention if the entire covering strip were made of elastic material. The width of the elastic closure strip can be varied. For example, it may consist of a narrow elastic wire or of a relatively broad strip of celluloid, metal, or the like. If desired, the width of the elastic closure strip can be equal to the width of the covering strip. The closure strip can be given a suitable initial shape, so that it tends to form either spiral or helical turns of suitable radius. Instead of roughening the surfaces of the covering strip and of the closure strip, roughened sections can be connected thereto. Instead of forming the end closure strip 2 of elastic material, the same may consist of soft, non-elastic, and pliable material of suitable tensile strength, such as, lead, tinfoil, or the like. This material may be used in the form of a wire or flat strip of suitable strength and length, which can be connected in any suitable manner to the covering strip. When the film is rolled up upon the take-up roller 4, the covering strip forms the outer layer or layers of the roll, and the closure strip is wound several times around the outer layer of the roll.

Due to the fact that the closure strip 2 is made of suitable soft material, it will fit firmly around the periphery of the roll, and the roll will maintain the desired tightly-wound up shape, due to the friction between the several turns, this friction being caused by the tension imparted to the closure member. The closure strip and the covering strip can be provided with suitable cooperating roughened surfaces, in order to increase the frictional grip between them, in the manner previously specified.

In both embodiments of the invention, it is not necessary to use any other closure means for the exposed film, before or after its removal from the camera.

I have shown preferred embodiments of my invention, but it is clear that numerous changes and omissions can be made without departing from its spirit.

I claim:

1. A photographic film roll having an elastic member associated with the rear end thereof, said elastic member having a predetermined shape which is adapted to cause said elastic member to clamp in position the windings of the film upon a take-up roller, said elastic member being sufficiently flexible to be wound upon the magazine roller.

2. A photographic film roll having a protective strip at the rear end thereof, and an elastic closure member associated with the rear of said protective strip, said elastic member having a predetermined shape which is adapted to cause said elastic member to clamp in position the windings of the film upon a take-up roller, said elastic member being sufficiently flexible to be wound upon the magazine roller.

3. A photographic film roll having a protective strip at the rear end thereof, said protective strip having an elastic member connected to the rear end thereof, said elastic member having a predetermined shape which is adapted to cause said elastic member to clamp in position the windings of the film upon a take-up roller, the adjacent surfaces of said protective strip and of said elastic member being formed so as to have a firm frictional grip upon each other, said elastic member being sufficiently flexible to be wound upon the magazine roller.

4. A photographic film roll having a protective strip at the rear end thereof, and means consisting of pliable and non-elastic material associated with the rear end of said protective strip, said means being adapted to maintain the roll of film in wound-up condition upon a take-up roller, said pliable and non-elastic material having sufficient rigidity to maintain it in tightly wound form around the roll of film upon said take-up roller, said pliable material being sufficiently pliable to be wound upon the magazine roller.

5. A photographic film roll having a protective strip at the rear end thereof, and means consisting of pliable and non-elastic material associated with the rear of said protective strip, said means being adapted to maintain the roll of film in wound-up condition upon a take-up roller, said pliable and non-elastic material having sufficient rigidity to maintain it in tightly wound form around the roll of film upon said take-up roller, the adjacent surfaces of said protective strip and of said means being shaped to have a firm frictional grip upon each other, said pliable material being sufficiently pliable to be wound upon the magazine roller.

6. A photographic film roll, having a protective strip at the rear end thereof, said strip being free from adhesive, said strip being sufficiently flexible to be wound upon the take-up roller, said strip having also sufficient rigidity to maintain it upon the take-up roller in wound up condition, so that said strip is then effective to maintain the film in wound up condition upon the take-up roller.

In testimony whereof I affix my signature.

EMIL MAYER.